United States Patent
Tano et al.

(10) Patent No.: US 8,697,025 B2
(45) Date of Patent: *Apr. 15, 2014

(54) RAW MATERIAL CHARCOAL COMPOSITION FOR NEGATIVE ELECTRODE MATERIAL OF LITHIUM ION SECONDARY BATTERY AND METHOD FOR PRODUCING THE SAME

(75) Inventors: Tamotsu Tano, Yamaguchi (JP); Takashi Oyama, Yamaguchi (JP); Hiromitsu Hashisaka, Yamaguchi (JP); Akio Sakamoto, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 900 days.

This patent is subject to a terminal disclaimer.

(21) Appl. No.: 12/741,107

(22) PCT Filed: Nov. 6, 2008

(86) PCT No.: PCT/JP2008/070192
§ 371 (c)(1),
(2), (4) Date: Jul. 1, 2010

(87) PCT Pub. No.: WO2009/060891
PCT Pub. Date: May 14, 2009

(65) Prior Publication Data
US 2010/0266479 A1   Oct. 21, 2010

(30) Foreign Application Priority Data

Nov. 8, 2007 (JP) ................................. 2007-291194

(51) Int. Cl.
| | | |
|---|---|---|
| *C01B 31/00* | (2006.01) | |
| *C01B 31/04* | (2006.01) | |
| *C01D 3/00* | (2006.01) | |
| *C09C 1/56* | (2006.01) | |
| *C01B 31/02* | (2006.01) | |
| *H01G 9/00* | (2006.01) | |
| *C10L 1/00* | (2006.01) | |
| *C10C 3/00* | (2006.01) | |
| *C10G 11/00* | (2006.01) | |
| *C10G 9/14* | (2006.01) | |
| *H01B 1/04* | (2006.01) | |
| *H01B 1/24* | (2006.01) | |

(52) U.S. Cl.
USPC ....... 423/445 R; 423/448; 423/460; 423/461; 361/502; 208/14; 208/131; 208/113; 252/502; 252/510; 201/6; 201/25

(58) Field of Classification Search
None
See application file for complete search history.

(56) References Cited

U.S. PATENT DOCUMENTS

| | | | |
|---|---|---|---|
| 4,753,786 A | 6/1988 | Watanabe et al. | |
| 5,698,341 A | 12/1997 | Tamaki et al. | |
| 6,156,432 A | 12/2000 | Mabuchi et al. | |
| 7,959,888 B2 * | 6/2011 | Oyama et al. | 423/445 R |
| 7,964,173 B2 * | 6/2011 | Oyama et al. | 423/445 R |
| 8,137,530 B2 * | 3/2012 | Tano et al. | 208/14 |
| 2007/0009418 A1 | 1/2007 | Kobayashi et al. | |
| 2009/0268375 A1 * | 10/2009 | Oyama et al. | 361/502 |
| 2010/0209331 A1 | 8/2010 | Sakamoto et al. | |
| 2010/0215567 A1 | 8/2010 | Sakamoto et al. | |

FOREIGN PATENT DOCUMENTS

| | | |
|---|---|---|
| EP | 0 184 679 | 6/1986 |
| EP | 1 982 956 | 10/2008 |
| EP | 2 192 641 | 6/2010 |
| JP | 4-24831 | 4/1987 |
| JP | 3056519 | 7/1992 |
| JP | 9-63584 | 3/1997 |
| JP | 10-36108 | 2/1998 |
| JP | 2003-297357 | 10/2003 |
| JP | 2006-66334 | 3/2006 |
| JP | 2006-252817 | 9/2006 |
| WO | 2005-027242 | 3/2005 |
| WO | WO 2007074939 A1 * | 7/2007 |

OTHER PUBLICATIONS

International Search Report issued with respect to PCT/JP2008/070192, mailed Feb. 24, 2009.
International Preliminary Report on Patentability for PCT/JP2008/070192, mailed Jul. 8, 2010.
English language Abstract for JP 4206365, corresponding to JP 3056519, Jul. 28, 1992.
English language Abstract for JP 62090863, corresponding to JP 4-24831, Apr. 25, 1987.
Search Report issued with respect to counterpart European Patent Application No. 08848345.8, mailed Jan. 2, 2013.
Nakajima et al., "Discharge Charaacteristics of Graphite Fluoride Prepared via Graphite Intercalation Compound with Covalent Bond", 1046B Extended Abstracts, vol. 85-2, Oct. 13, 1985, pp. 143-144 (XP001264523).

* cited by examiner

*Primary Examiner* — Guinever Gregorio
(74) *Attorney, Agent, or Firm* — Greenblum & Bernstein, P.L.C.

(57) ABSTRACT

In the raw coke composition of the invention, as the starting material for a negative electrode material of a lithium ion secondary battery, the ratio of the crystallite size Lc(002) and lattice constant co(002) (Lc(002)/co(002)) on the 002 plane is no greater than 180, and the ratio of the crystallite size La(110) and the lattice constant ao(110) (La(110)/ao(110)) on the 110 plane is no greater than 1500, as determined by X-ray diffraction upon graphitizing in an inert gas atmosphere at a temperature of 2800° C.

4 Claims, No Drawings

RAW MATERIAL CHARCOAL COMPOSITION FOR NEGATIVE ELECTRODE MATERIAL OF LITHIUM ION SECONDARY BATTERY AND METHOD FOR PRODUCING THE SAME

TECHNICAL FIELD

The present invention relates to a raw coke composition as the raw material for a negative electrode material of a lithium ion secondary battery, and to a method for producing it.

BACKGROUND ART

Lithium ion secondary batteries have lighter weight and higher input/output characteristics than conventional secondary batteries such as nickel cadmium cells, nickel hydrogen cells and lead-acid batteries and have therefore been considered promising in recent years as power sources for electric vehicles and hybrid vehicles. Carbon materials are used as active materials in secondary battery electrodes, and have been extensively studied with the aim of increasing secondary battery performance (see Patent documents 1 and 2, for example).

Carbon materials used as negative electrode materials in lithium ion secondary batteries are generally classified as either graphite or amorphous. Graphite carbon materials have the advantage of high energy density per unit volume compared to amorphous carbon materials. For this reason, graphite carbon materials are widely used as negative electrode materials in lithium ion secondary batteries for cellular phones and laptop computers that are compact and require large service capacities. Graphite has a structure with layers of carbon atoms regularly arranged in a hexagonal mesh, and during charge-discharge, intercalation-deintercalation of lithium ions takes place at the edges of the hexagonal mesh.

CITATION LIST

[Patent document 1] Japanese Patent Publication No. 3056519
[Patent document 2] Japanese Examined Patent Publication HEI No. 4-24831

SUMMARY OF INVENTION

Problems to be Solved by the Invention

However, while increased energy densities per unit volume are obtained as mentioned above when graphite carbon materials are used as negative electrode materials in lithium ion secondary batteries, the high-speed charge-discharge characteristics, and especially the high-speed charge characteristic, are still in need of improvement for application to automobiles such as hybrid vehicles. This is due primarily to the fact that the high crystallinity of the graphite carbon material limits diffusion of solvated lithium ion in the carbon layer when it is used as the negative electrode of a lithium ion secondary battery.

The present invention has been accomplished in light of these circumstances, and its object is to provide a raw coke composition for a negative electrode material of a lithium ion secondary battery which is useful for achieving excellent high-speed charge-discharge characteristics for lithium ion secondary batteries, as well as a method for producing the same.

Means for Solving the Problems

For production of a lithium ion secondary battery with high charge-discharge capacity and excellent high-speed charge-discharge characteristics, it is essential to use a carbon material with a highly developed crystal structure as the negative electrode material, and to form numerous solvated lithium ion diffusion channels in the carbon layer. In other words, development of the carbon layer surface and formation of more carbon edges are necessary.

The present inventors have studied carbon materials with such excellent crystal structures, focusing on the mechanism of formation of the crystal structures. For example, needle coke is produced by a process in which heavy oil is subjected to high-temperature treatment to cause thermal decomposition and polycondensation reaction, producing liquid crystal spheres referred to as the "mesophase", which associate to produce large liquid crystals known as the "bulk mesophase" as an intermediate product. The present inventors have extensively studied effects on crystal structure by the stock oil compositions and raw coke compositions used in production of carbon materials.

These studies have led the present inventors to understand that, in order to obtain a lithium ion secondary battery exhibiting the required performance described above, it is useful to produce the raw coke composition from a stock oil composition obtained by combining a heavy oil that generates a satisfactory bulk mesophase, with a heavy oil that can generate gas that contributes to formation of a lithium ion diffusion channel in the carbon layer when the bulk mesophase undergoes polycondensation to carbonization and solidification. Based on this knowledge, and upon much evaluation testing to discover the preferred properties for obtained raw coke compositions, it was found that a carbon material with prescribed properties, obtained when graphitizing is carried out at a temperature of 2800° C., is suitable as the raw coke composition for a negative electrode material, and the invention was thus completed.

Specifically, the invention is a method for producing a raw coke composition as the starting material for a negative electrode material of a lithium ion secondary battery, which method comprises a first step of preparing a stock oil composition containing a first heavy oil obtained by hydrodesulfurization treatment and having a sulfur content of no greater than 0.6 wt %, a nitrogen content of no greater than 0.3 wt % and an aromatic index of 0.1 or greater, and a second heavy oil with an aromatic index of 0.3 or greater and an initial boiling point of 150° C. or higher, and a second step of coking treatment of the stock oil composition so that the obtained raw coke composition satisfies the following conditions (A).

(A) The ratio of the crystallite size Lc(002) and lattice constant co(002) (Lc(002)/co(002)) on the 002 plane is no greater than 180, and the ratio of the crystallite size La(110) and the lattice constant ao(110) (La(110)/ao(110)) on the 110 plane is no greater than 1500, as determined by X-ray diffraction when the raw coke composition has been subjected to graphitizing in an inert gas atmosphere at a temperature of 2800° C.

According to the invention, it is possible to stably produce a raw coke composition that is useful for achieving high-speed charge-discharge characteristics for lithium ion secondary batteries, by using a stock oil composition comprising a hydrodesulfurized oil (first heavy oil) containing a saturated component which serves as a gas generating source during carbonization and solidification of the obtained raw coke composition by further heat treatment, and a heavy oil (second heavy oil) obtained by fluidized catalytic cracking treatment, for example, that contributes to production of a satisfactory bulk mesophase.

According to the invention, the first heavy oil is preferably one obtained by hydrodesulfurization treatment of heavy oil with a sulfur content of 1 wt % or greater under conditions with a hydrogen partial pressure of at least 5 MPa, and having a sulfur content of no greater than 0.6 wt %. Hydrodesulfurization treatment under these conditions can yield a heavy oil with a sufficient saturated component content, that can serve as a gas generating source during carbonization and solidification.

The raw coke composition obtained from the second step preferably satisfies the following conditions. Specifically, the raw coke composition preferably has a sulfur content of no greater than 0.4 wt % and a nitrogen content of no greater than 0.3 wt %. This can minimize degassing, when the raw coke composition is heat treated for use as a negative electrode material and the raw coke composition is thus carbonized and graphitized. It will be possible, as a result, to satisfactorily reduce generation of crystal defects caused by disorder of the crystal orientation, to obtain a carbon material with a highly developed crystal structure.

From the viewpoint of stably obtaining a raw coke composition that can exhibit excellent performance as a negative electrode material of a lithium ion secondary battery, the first heavy oil content is preferably 10-50 parts by weight and the second heavy oil is preferably 50-90 parts by weight, with respect to 100 parts by weight as the total weight of the stock oil composition.

The invention further provides a raw coke composition to serve as the starting material for a negative electrode material of a lithium ion secondary battery, wherein the ratio of the crystallite size $Lc(002)$ and lattice constant $co(002)$ ($Lc(002)/co(002)$) on the 002 plane is no greater than 180, and the ratio of the crystallite size $La(110)$ and the lattice constant $ao(110)$ ($La(110)/ao(110)$) on the 110 plane is no greater than 1500, as determined by X-ray diffraction upon graphitizing in an inert gas atmosphere at a temperature of 2800° C.

By using a raw coke composition of the invention to produce a negative electrode material for a lithium ion secondary battery, it is possible to achieve high levels for both high charge-discharge capacity and excellent high-speed charge-discharge characteristics for lithium ion secondary batteries. The raw coke composition of the invention may be used directly as a carbon material for the negative electrode of a lithium ion secondary battery, but preferably a carbon material obtained after further heat treatment of the starting carbon composition is used as the carbon material (active material) for the negative electrode of a lithium ion secondary battery.

From the viewpoint of highly developing the crystal structure of the carbon material obtained by heat treatment of the raw coke composition of the invention, the raw coke composition preferably has a sulfur content of no greater than 0.4 wt % and a nitrogen content of no greater than 0.3 wt %.

Effect of the Invention

According to the invention there is provided a raw coke composition for a negative electrode material of a lithium ion secondary battery which is useful for achieving excellent high-speed charge-discharge characteristics for lithium ion secondary batteries, as well as a method for producing the same.

DESCRIPTION OF EMBODIMENTS

Preferred embodiments of the invention will now be described in detail.

(Raw Coke Composition for Negative Electrode Material of Lithium Ion Secondary Battery)

The raw coke composition for a negative electrode material of a lithium ion secondary battery according to this embodiment has properties, determined by X-ray diffraction, satisfying prescribed conditions when subjected to graphitizing at 2800° C. Graphitizing at 2800° C. is at least 1 minute of heat treatment at 2800° C. in a high purity argon gas atmosphere, with temperature increase after about 15° C./min. The carbon material obtained by heat treatment of the raw coke composition of this embodiment exhibits excellent performance as a negative electrode material for a lithium ion secondary battery.

When subjected to graphitizing at 2800° C., the raw coke composition of this embodiment has a ratio between the crystallite size $Lc(002)$ and the lattice constant $co(002)$ on the 002 plane ($Lc(002)/co(002)$) of no greater than 180, as determined by X-ray diffraction. The $Lc(002)/co(002)$ value is preferably no greater than 175 and more preferably no greater than 170. A raw coke composition with an $Lc(002)/co(002)$ value of greater than 180 is considered to have an insufficient proportion of hexagonal mesh surface edge faces among the crystallites. Intercalation-deintercalation reaction of lithium ions from the edges during charge-discharge is therefore restricted, and a lithium ion secondary battery with the negative electrode constructed of a material produced using such a raw coke composition has low charge-discharge capacity and an insufficient high-speed charge characteristic.

Also, when subjected to graphitizing at 2800° C., the raw coke composition of this embodiment has a ratio between the crystallite size $La(110)$ and the lattice constant $ao(110)$ on the 110 plane ($La(110)/ao(110)$) of no greater than 1500, as determined by X-ray diffraction. The $La(110)/ao(110)$ value is preferably no greater than 1400 and more preferably no greater than 1300. A raw coke composition with an $La(110)/ao(110)$ value of greater than 1500 is considered to have an insufficient proportion of hexagonal mesh surface edge faces among the crystallites. Intercalation-deintercalation reaction of lithium ions from the edges during charge-discharge is therefore restricted, and a lithium ion secondary battery with a negative electrode constructed using such a raw coke composition has low charge-discharge capacity and an insufficient high-speed charge characteristic.

The sulfur content of the raw coke composition is preferably no greater than 0.4 wt % and more preferably no greater than 0.3 wt % based on the total weight. Also, the nitrogen content of the raw coke composition is preferably no greater than 0.3 wt % and more preferably no greater than 0.2 wt % based on the total weight. If the sulfur content and nitrogen content of the raw coke composition exceed these upper limits, degassing may result in disorder of the crystal orientation when the raw coke composition is subjected to further heat treatment, tending to create crystal defects. The sulfur content and nitrogen content of the raw coke composition are the values measured according to JIS M 8813.

For this embodiment, the lattice constant and crystallite size of the raw coke composition after graphitizing at 2800° C. are the values determined by X-ray diffraction according to "Measurement Methods for Lattice Constants and Crystallite Sizes of Artificial Graphite" established by the 117th Committee of the Japan Society for the Promotion of Science, and specifically they are measured as follows.

A mixture comprising an internal reference sample at 10 mass % combined with the sample powder (raw coke composition graphitized at 2800° C.) is filled into a glass specimen holder and the X-ray diffraction pattern is obtained with a line source of CuKα-rays monochromatized with a graphite monochromator. The peak position in the diffraction pattern is determined by the elastic center method (a method in which the center of gravity of the diffraction profile is calculated and the position of the peak at the corresponding 2θ value is determined), with correction using the diffraction peak for high purity silicon powder as the reference material.

More specifically, the measurement data was processed by smoothing and background removal, and then by absorption correction, polarization correction and Lorentz correction, the peak position and half-power band width of the silicon reference sample were used for correction against the sample peak, and the lattice constant and crystallite size were determined by the Gakushin method. The crystallite size was calculated from the corrected peak half-power band width using the following Scherrer formula. The measurement and analysis were each conducted 3 times.

$$L = K\lambda/\beta_O \cos\theta_B$$

In the formula, L represents the crystallite size (nm); K represents a constant (=1.0); $\lambda$, represents the wavelength (=0.15406 nm); $\theta_B$ represents the Bragg angle; and $\beta_O$ represents the half-power band width (corrected value).

The raw coke composition of this embodiment that has been obtained by graphitizing at 2800° C. characteristically has a structure highly similar to graphite when their X-ray diffraction patterns are compared.

(First and Second Heavy Oils)

The first heavy oil and second heavy oil used for production of the raw coke composition will now be described.

The first heavy oil is heavy oil obtained by hydrodesulfurization treatment, and it has a sulfur content of no greater than 0.6 wt % and a nitrogen content of no greater than 0.3 wt %, based on the total weight of the first heavy oil, and an aromatic index of at least 0.1.

The sulfur content of the first heavy oil is no greater than 0.6 wt % and preferably no greater than 0.5 wt %. A sulfur content of greater than 0.6 wt % may lead to premature coking by the sulfur content. The raw coke composition will thus have a low-crystalline structure, and development of the carbon hexagonal mesh surface will be insufficient even with additional carbonization and graphitizing of the raw coke composition. As a result, the amount of lithium ion that can be stored as graphite intercalated lithium ion will be inadequate, making it difficult to obtain a negative electrode carbon material with an excellent charge-discharge characteristic. If the first heavy oil has a sulfur content of greater than 0.6 wt %, the sulfur content remaining in the raw coke composition will be too high, potentially resulting in expansion known as "puffing" as the sulfur content volatilizes during carbonization and graphitization of the raw coke composition, and consequently insufficient strength of the negative electrode carbon material. From the viewpoint of preventing such puffing, the first heavy oil used preferably has a sufficiently reduced sulfur content.

The nitrogen content of the first heavy oil is no greater than 0.3 wt % and preferably no greater than 0.2 wt %. If the nitrogen content is greater than 0.3 wt %, the nitrogen content remaining in the raw coke composition will be too high, potential resulting in creation of crystal defects and reduced strength of the negative electrode carbon material as the nitrogen content volatilizes during carbonization and graphitization of the raw coke composition, similar to an excessively high sulfur content.

The aromatic index of the first heavy oil is at least 0.1 and preferably at least 0.15. If the aromatic index of the first heavy oil is less than 0.1 the raw coke composition yield will be insufficient. The saturated component content in the first heavy oil is preferably 40 wt % or greater, more preferably 55 wt % or greater and even more preferably 60 wt % or greater. On the other hand, the upper limit for the saturated component content is preferably 85 wt % and more preferably 80 wt %.

The conditions for hydrodesulfurization treatment to obtain the first heavy oil will now be described. The hydrodesulfurization treatment to obtain the first heavy oil is carried out under conditions with a heavy oil having a sulfur content of 1 wt % or greater and with a hydrogen partial pressure of at least 5 MPa, preferably at least 8 MPa and more preferably at least 10 MPa. If the hydrogen partial pressure is less than this lower limit, hydrogenation will tend to be insufficient and it may be difficult to obtain a heavy oil that is effective as a stock oil in a raw coke composition for a negative electrode material of a lithium ion secondary battery.

The conditions for hydrodesulfurization treatment other than the hydrogen partial pressure are not particularly restricted, but each of the conditions are preferably set as follows. Specifically, the total pressure during hydrodesulfurization treatment is preferably 6-25 MPa and more preferably 10-22 MPa; the temperature for hydrodesulfurization is preferably 300-500° C. and more preferably 350-450° C.; the hydrogen/oil ratio is preferably 400-3000 NL/L and more preferably 500-1800 NL/L; and the liquid space velocity (LHSV) is preferably 0.1-31 $h^{-1}$, more preferably 0.15-1.0 $h^{-1}$ and even more preferably 0.15-0.75 $h^{-1}$.

The catalyst used for the hydrodesulfurization treatment (hydrodesulfurization catalyst) may be a Ni—Mo catalyst, Co—Mo catalyst, or a combination of these, and it may be a commercially available product.

The heavy oil used as the stock oil for the first heavy oil preferably has a sulfur content of 1 wt % or greater, and it may be, for example, crude oil, atmospheric distillation bottom oil or vacuum distillation bottom oil obtained by distillation of crude oil, or visbreaking oil, tar sand oil, shale oil, or a blended oil of the foregoing. Atmospheric distillation residue and vacuum distillation bottom oil are preferably used among these.

The second heavy oil is a heavy oil obtained by fluidized catalytic cracking, and it has an initial boiling point of 150° C. or higher and an aromatic index of at least 0.3.

The initial boiling point of the second heavy oil is at least 150° C. and preferably at least 170° C. An initial boiling point of below 150° C. will result in an insufficient yield of the raw coke composition.

The aromatic index of the second heavy oil is at least 0.3 and preferably at least 0.4. If the aromatic index is less than 0.3 the raw coke composition yield will be insufficient. The upper limit for the aromatic index is preferably 0.9 and more preferably 0.8, from the viewpoint of compatibility with the first heavy oil during co-carbonization (coking).

The second heavy oil has a sulfur content of preferably no greater than 0.5 wt %, more preferably no greater than 0.4 wt % and even more preferably no greater than 0.3 wt %, based on the total weight of the heavy oil. The second heavy oil also has a nitrogen content of preferably no greater than 0.2 wt %, more preferably no greater than 0.15 wt % and even more preferably no greater than 0.1 wt %, based on the total weight of the heavy oil. The reason for the preferred upper limits for the sulfur content and nitrogen content of the second heavy oil is the same as for the first heavy oil.

The conditions for fluidized catalytic cracking to obtain the second heavy oil will now be described. The term "fluidized catalytic cracking" means treatment using a solid acid catalyst for decomposition of the high boiling point fraction. The fluidized catalytic cracker used for the treatment is called a FCC (Fluidized Catalytic Cracking) apparatus.

The fluidized catalytic cracking to obtain the second heavy oil is not particularly restricted so long as it can yield a heavy oil with an initial boiling point of 150° C. or greater and an aromatic index of 0.3 or greater, but preferably the reaction temperature is 480-550° C., the total pressure is 100-300 kPa, the catalyst/oil ratio is 1-20 and the contact time is 1-10 seconds.

The catalyst used for fluidized catalytic cracking may be, for example, a silica-alumina catalyst or zeolite catalyst, or such a catalyst supporting a metal such as platinum (Pt). Commercial catalysts may also be used.

The stock oil for the second heavy oil is not particularly restricted so long as it can yield heavy oil with an initial boiling point of 150° C. or higher and an aromatic index of 0.3 or greater by fluidized catalytic cracking, but it is preferably hydrocarbon oil with a 15° C. density of 0.8 g/cm$^3$ or greater. As such stock oils there may be mentioned atmospheric distillation bottom oil, vacuum distillation bottom oil, shale oil, tar sand bitumen, Orinoco tar, coal liquefaction oil, and heavy oils obtained by hydrorefining of these oils.

The sulfur content and nitrogen content of the heavy oil are the values measured according to JIS K2541 and JIS K2609. The aromatic index of the heavy oil is the value determined by the Knight method, and it indicates the percentage of aromatic carbons in the material (see "Characterization of Pitch, II. Chemical structure", Yokono, Sanada (Carbon, 1981, No. 105, p 73-81)). The saturated component content in the heavy oil is the value measured using a thin-layer chromatograph. The initial boiling point of the heavy oil is the value measured according to JIS K2254.

(Method for Producing Raw Coke Composition)

A method for producing the raw coke composition will now be described. The method for producing a raw coke composition according to this embodiment comprises a step of blending a hydrodesulfurized residue oil (first heavy oil) and a fluidized catalytic cracked residue oil (second heavy oil), in such a manner that the properties determined by X-ray diffraction of the obtained raw coke composition satisfy the conditions specified above (the ratio of the crystallite size Lc(002) and lattice constant co(002) (Lc(002)/co(002)) on the 002 plane is no greater than 180, and the ratio of the crystallite size La(110) and the lattice constant ao(110) (La(110)/ao(110)) on the 110 plane is no greater than 1500, upon graphitizing in an inert gas atmosphere at a temperature of 2800° C.) to prepare a stock oil composition (first step) and a step of coking treatment of the stock oil composition (second step). According to the production method of this embodiment, wherein a stock oil composition comprising the blended first heavy oil and second heavy oil is subjected to coking treatment, it is possible to stably obtain a raw coke composition that can exhibit excellent properties as the negative electrode material for a lithium ion secondary battery.

During preparation of the stock oil composition, the mixing ratio of the first heavy oil and second heavy oil is not particularly restricted so long as a raw coke composition satisfying the aforementioned conditions can be obtained, but from the viewpoint of stably obtaining a raw coke composition that can exhibit excellent performance as a carbon material for the negative electrode of a lithium ion secondary battery, the first heavy oil content is preferably 10-50 parts by weight and more preferably 20-50 parts by weight with respect to 100 parts by weight of the stock oil composition. On the other hand, the second heavy oil content is preferably 50-90 parts by weight and more preferably 50-80 parts by weight with respect to 100 parts by weight of the stock oil composition. From the same viewpoint, the total of the contents of the first and second heavy oils is preferably 60-100 parts by weight and more preferably 70-100 parts by weight with respect to 100 parts by weight of the stock oil composition.

As components to be included in the stock oil composition in addition to the first and second heavy oil, there may be mentioned low-sulfur vacuum gas oil and desulfurized vacuum gas oil.

The method of coking treatment of the stock oil composition to obtain the raw coke composition is preferably a delayed coking method. More specifically, the stock oil composition is heat treated under pressure in a delayed coker. The pressure and temperature in the delayed coker are preferably 300-800 kPa and 400-600° C., respectively.

The raw coke composition obtained from the coking treatment (petroleum raw coke) may be used directly as a negative electrode material in a lithium ion secondary battery, but it is preferably used as a negative electrode material of a lithium ion secondary battery after further heat treatment of the raw coke composition. Specifically, the carbon material used for the negative electrode of a lithium ion secondary battery is preferably a carbon material obtained by calcining the raw coke composition at 1200-1500° C. under an inert gas atmosphere (calcined carbon), or a carbon material obtained by further heat treatment of the raw coke composition or calcined carbon at 2000-3000° C. for conversion to artificial graphite.

A heavy oil obtained by fluidized catalytic cracking treatment was used as the second heavy oil for this embodiment, but this is not restrictive so long as the conditions relating to the aromatic index and initial boiling point are satisfied. For example, ethylene tar may be used as the second heavy oil, instead of heavy oil obtained by fluidized catalytic cracking treatment. Ethylene tar is obtained as the bottom portion in naphtha thermal cracking during the production of olefins such as ethylene and propylene. For example, ethylene tar can be obtained by steam cracking in a typical tubular heating furnace process, whereby naphtha is introduced together with steam into a thermolytic furnace for thermolysis at a temperature of about 760-900° C., and the obtained hydrocarbons are quenched and then introduced into a rectification column and the bottom portion thereof obtained.

(Lithium Secondary Battery)

The following explanation concerns a lithium secondary battery employing a carbon material for the negative electrode of a lithium ion secondary battery obtained from the raw coke composition of the invention.

There are no particular restrictions on the method for producing the negative electrode of the lithium ion secondary battery, and for example, it may be obtained by pressure molding a mixture comprising a carbon material obtained by heat treatment of the raw coke composition of this embodiment, a binder, and if necessary a conductive aid and organic solvent. As an alternative method, a carbon material obtained by heat treatment of the raw coke composition, a binder and a conductive aid may be formed into a slurry in an organic solvent, and the slurry coated onto a collector and then dried. The carbon material obtained by heat treatment of the raw coke composition will sometimes be referred to hereunder simply as "carbon material".

The binder may be polyvinylidene fluoride, polytetrafluoroethylene, SBR (styrene-butadiene rubber) or the like. A suitable amount of binder is 1-30 parts by weight, with about 3-20 parts by weight being preferred, with respect to 100 parts by weight of the carbon material.

The conductive aid may be carbon black, graphite, acetylene black, conductive indium-tin oxide, or a conductive polymer such as polyaniline, polythiophene or polyphenylenevinylene. The amount of conductive aid used is preferably 1-15 parts by weight with respect to 100 parts by weight of the carbon material.

As organic solvents there may be mentioned dimethylformamide, N-methylpyrrolidone, isopropanol and toluene.

The method for mixing the carbon material and binder, and the conductive aid and organic solvent used as necessary, may employ a known apparatus such as a screw-type kneader, ribbon mixer, universal mixer, planetary mixer or the like. The mixture is formed by roll pressing or press pressing, with the pressure preferably being about 100-300 MPa.

As an alternative method for producing the negative electrode for a lithium ion secondary battery, the carbon material, binder and conductive aid may be formed into a slurry in an organic solvent, and the slurry coated onto a collector and dried.

The material and form of the collector are not particularly restricted, and for example, aluminum, copper, nickel, titanium, stainless steel or the like may be used as a foil, perforated foil or mesh, and formed as a band. A porous material such as a porous metal (metal foam) or carbon paper may also be used.

The method for coating the negative electrode material slurry onto the collector is not particularly restricted, and as examples there may be mentioned known methods such as metal mask printing, electrostatic coating method, dip coating, spray coating, roll coating, doctor blading, gravure coating, screen printing and the like. After coating, it may be subjected to rolling treatment with a flat press or calender roll, if necessary.

Also, integration of the collector with a negative electrode material slurry molded into the form of a sheet, pellets or the like may be carried out by a known method using, for example, a roll or press, or a combination thereof.

A lithium ion secondary battery employing a carbon material for the negative electrode of a lithium ion secondary battery according to this embodiment can be obtained by, for example, situating a negative electrode for a lithium ion secondary battery, produced in the manner described above, opposite a positive electrode via a separator, and injecting an electrolyte solution between them.

There are no particular restrictions on the active material used for the positive electrode, and for example, a metal compound, metal oxide, metal sulfide or conductive polymer material capable of doping or intercalation with lithium ion may be used, examples of which include lithium cobaltate ($LiCoO_2$), lithium nickelate ($LiNiO_2$), lithium manganate ($LiMnO_2$), complex oxides of the foregoing ($LiCO_XNi_YM-n_ZO_2$, X+Y+Z=1), lithium manganese spinel ($LiMn_2O_4$), lithium vanadium compounds, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, olivine-type $LiMPO_4$ (M:Co, Ni, Mn, Fe), conductive polymers such as polyacetylene, polyaniline, polypyrrole, polythiophene and polyacene, porous carbon, and mixtures of the foregoing.

Examples of separators to be used include nonwoven fabrics, cloths and microporous films composed mainly of polyolefins such as polyethylene or polypropylene, as well as combinations thereof. It is not necessary to use a separator if the positive electrode and negative electrode of the lithium ion secondary battery to be fabricated will not be in direct contact.

The electrolyte solution and electrolytes used in the lithium secondary battery may be a publicly known organic electrolyte solution, inorganic solid electrolytes or polymer solid electrolytes. An organic electrolyte solution is preferred from the viewpoint of electrical conductivity.

For organic electrolyte solutions there may be mentioned organic solvents including ethers such as dibutyl ether, ethyleneglycol monomethyl ether, ethyleneglycol monoethyl ether, ethyleneglycol monobutyl ether, diethyleneglycol monomethyl ether and ethyleneglycol phenyl ether; amides such as N-methylformamide, N,N-dimethylformamide, N-ethylformamide, N,N-diethylformamide, N-methylacetamide, N,N-dimethylacetamide, N-ethylacetamide and N,N-diethylacetamide; sulfur-containing compounds such as dimethyl sulfoxide and sulfolane; dialkylketones such as methyl ethyl ketone and methyl isobutyl ketone; cyclic ethers such as tetrahydrofuran and 2-methoxytetrahydrofuran; carbonates such as ethylene carbonate, butylene carbonate, diethyl carbonate, dimethyl carbonate, methylethyl carbonate, propylene carbonate and vinylene carbonate; γ-butyrolactone; N-methylpyrrolidone; acetonitrile, nitromethane and the like. Preferred examples among these include ethylene carbonate, butylene carbonate, diethyl carbonate, dimethyl carbonate, methylethyl carbonate, propylene carbonate, vinylene carbonate, γ-butyrolactone, diethoxyethane, dimethyl sulfoxide, acetonitrile and tetrahydrofuran, with particularly preferred examples including carbonate-based non-aqueous solvents such as ethylene carbonate and propylene carbonate. Any of these solvents may be used alone, or two or more thereof may be used in admixture.

Lithium salts are used as solutes (electrolytes) in these solvents. Commonly known lithium salts include $LiClO_4$, $LiBF_4$, $LiPF_6$, $LiAlCl_4$, $LiSbF_6$, $LiSCN$, $LiCl$, $LiCF_3SO_3$, $LiCF_3CO_2$ and $LiN(CF_3SO_2)_2$.

As polymer solid electrolytes there may be mentioned polyethylene oxide derivatives and polymers comprising those derivatives, polypropylene oxide derivatives and polymers comprising those derivatives, phosphoric acid ester polymers, and polycarbonate derivatives and polymers comprising those derivatives.

There are absolutely no restrictions on selection of any of the other members required for construction of the battery.

There are also no restrictions on the structure of the lithium ion secondary battery, but normally it will have a structure comprising a positive electrode and negative electrode, with a separator if necessary, wrapped up in a flat spiral fashion as a rolled polar plate group, or stacked as plates into a layered polar plate group, with the polar plate group being sealed in an outer casing. Lithium ion secondary batteries are used as paper batteries, button batteries, coin batteries, stacked cells, cylindrical cells and the like.

A lithium ion secondary battery employing a carbon material for the negative electrode of a lithium ion secondary battery according to this embodiment has excellent rapid charge-discharge characteristics compared to a lithium ion secondary battery employing a conventional carbon material, and it can be used in automobiles, and specifically in hybrid vehicles, plug-in hybrid vehicles and electric vehicles.

EXAMPLES

The present invention will now be explained in greater detail based on examples and comparative examples, with the understanding that these examples are in no way limitative on the invention.

Example 1

(1) Fabrication of Negative Electrode Carbon Material

Atmospheric distillation bottom oil with a sulfur content of 4.0 wt % was hydrodesulfurized at a hydrogen partial pressure of 8 MPa in the presence of a Ni—Mo catalyst to obtain hydrodesulfurized oil (first heavy oil) having a sulfur content of 0.31 wt %, a nitrogen content of 0.22 wt % and an aromatic index of 0.2. Separately, desulfurized vacuum gas oil (sulfur content: 500 ppm by weight, 15° C. density: 0.88 g/cm$^3$) was subjected to fluidized catalytic cracking to obtain fluidized catalytic cracked bottom oil (second heavy oil) having an aromatic index of 0.4, an initial boiling point of 200° C., a sulfur content of 0.24 wt % and a nitrogen content of 0.11 wt %.

The hydrodesulfurized oil and fluidized catalytic cracked bottom oil were blended at 1:3 (weight ratio), and the blend was introduced into a delayed coker for coking treatment to obtain a raw coke composition with a sulfur content of 0.29 wt % and a nitrogen content of 0.14 wt %. The raw coke composition was then introduced into a rotary kiln and calcined at 1500° C. to obtain a carbon material. The obtained carbon material was pulverized to obtain carbon fine particle material A with a mean particle size of 25 μm.

The raw coke composition was subjected to graphitizing at a temperature of 2800° C., and the properties after graphitizing were evaluated. The properties of the obtained graphitized product (2800° C.-treated product) are shown in Table 1. The lattice constant and crystallite size were measured by X-ray diffraction, according to "Measurement Methods for Lattice Constants and Crystallite Sizes of Artificial Graphite" established by the 117th Committee of the Japan Society for the Promotion of Science.

(2) Charge-Discharge Evaluation of Negative Electrode Material (a) Fabrication of Negative Electrode Carbon fine particle material A as the active material of the negative electrode (treatment temperature: 1500° C.), acetylene black (AB) as the conductive material and polyvinylidene fluoride (PVDF) as the binder were combined in N-methyl-2-pyrrolidone at a ratio of 80:10:10 (weight ratio) to prepare a slurry. The slurry was coated onto a copper foil and dried for 10 minutes with a hot plate, and press molded with a roll press.

(b) Fabrication of Evaluation Cell

There were used the aforementioned composition as the negative electrode (30×50 mm), lithium nickelate as the positive electrode (30×50 mm), a mixture of ethylene carbonate (EC)/methyl ethyl carbonate (MEC) (EC/MEC weight ratio: 3/7, solute: LiPF$_6$ (1 M volume molar concentration)) as the electrolyte solution and a polyethylene porous film as the separator.

(c) Evaluation of High-Speed Charge-Discharge Rate Characteristics

Table 1 shows the results of measuring the high-speed (10 C) charge-discharge characteristics of the aforementioned cell. The cell fabricated in this example had a charge capacity of 170 mAh/g upon high-speed charge at 10 C, and therefore exhibited a very excellent high-speed charge characteristic.

Example 2

An evaluation cell was fabricated in the same manner as Example 1, except that carbon fine particle material B (treatment temperature: 2400° C.), obtained by heat treatment of carbon fine particle material A for 30 minutes at 2400° C. under a nitrogen gas atmosphere was used as the active material of the negative electrode instead of carbon fine particle material A (treatment temperature: 1500° C.). Table 1 shows the results of evaluating the high-speed charge-discharge characteristics by the same procedure as Example 1. The battery fabricated in this example had a charge capacity of 260 mAh/g upon high-speed charge at 10 C, and therefore exhibited a very excellent high-speed charge characteristic.

Comparative Example 1

A raw coke composition (sulfur content: 0.31 wt %, nitrogen content: 0.19 wt %) was obtained in the same manner as Example 1, except that the same type of heavy oil as the fluidized catalytic cracked bottom oil used in Example 1 (aromatic index: 0.4, initial boiling point: 200° C., sulfur content: 0.24 wt %, nitrogen content: 0.11 wt %) was used alone as the stock oil composition instead of preparing a stock oil composition by blending a hydrodesulfurized oil and fluidized catalytic cracked bottom oil. The raw coke composition was then introduced into a rotary kiln and calcined at 1500° C. to obtain a carbon material. The obtained carbon material was pulverized to obtain carbon fine particle material C with a mean particle size of 25 μm. Carbon fine particle material C was further subjected to graphitizing at a temperature of 2800° C. under an inert gas atmosphere. The properties of the product obtained by graphitizing at 2800° C. (2800° C.-treated product) are shown in Table 1.

An evaluation cell was fabricated in the same manner as Example 1, except that carbon fine particle material C was used as the active material of the negative electrode instead of carbon fine particle material A. Table 1 shows the results of evaluating the high-speed charge-discharge characteristics by the same procedure as Example 1. The cell fabricated in this comparative example had a charge capacity of 100 mAh/g upon high-speed charge at 10 C, and was therefore inferior to the cells fabricated in Examples 1 and 2.

Comparative Example 2

An evaluation cell was fabricated in the same manner as Comparative Example 1, except that carbon fine particle material D (treatment temperature: 2400° C.), obtained by heat treatment of carbon fine particle material C for 30 minutes at 2400° C. under a nitrogen gas atmosphere was used as the active material of the negative electrode instead of carbon fine particle material C (treatment temperature: 1500° C.). Table 1 shows the results of evaluating the high-speed charge-discharge characteristics by the same procedure as Example 1. The cell fabricated in this comparative example had a charge capacity of 100 mAh/g upon high-speed charge at 10 C, and was therefore inferior to Examples 1 and 2.

Comparative Example 3

An evaluation cell was fabricated in the same manner as Example 1, except that natural graphite was used as the active material of the negative electrode instead of carbon fine particle material A (treatment temperature: 1500° C.). Table 1 shows the results of evaluating the high-speed charge-discharge characteristics by the same procedure as Example 1. The cell fabricated in this comparative example had a charge capacity of no greater than 10 mAh/g upon high-speed charge at 10 C, and was therefore markedly inferior to Examples 1 and 2.

TABLE 1

| | | Example 1 | Example 2 | Comp. Ex. 1 | Comp. Ex. 2 | Comp. Ex. 3 |
|---|---|---|---|---|---|---|
| First heavy oil | Sulfur content (wt %) | 0.31 | 0.31 | — | — | — |
| | Nitrogen content (wt %) | 0.22 | 0.22 | — | — | — |
| | Aromatic index | 0.2 | 0.2 | — | — | — |
| Second heavy oil | Aromatic index | 0.4 | 0.4 | 0.4 | 0.4 | — |
| | Initial boiling point | 200 | 200 | 200 | 200 | — |
| Raw coke composition | Sulfur content (wt %) | 0.29 | 0.29 | 0.31 | 0.31 | — |
| | Nitrogen content (wt %) | 0.14 | 0.14 | 0.19 | 0.19 | — |
| Carbon material used for active material of negative electrode | | Material A | Material B | Material C | Material D | Natural graphite |
| 2800.-treated raw coke composition | $Lc(002)/Co(002)$ | 165 | 165 | 200 | 200 | — |
| | $La(110)/Ao(110)$ | 1140 | 1140 | 1660 | 1660 | — |
| High-speed charge-discharge capacity (10C) | Discharge capacity (mAh/g) | 190 | 260 | 120 | 120 | ≤50 |
| | Charge capacity (mAh/g) | 170 | 260 | 100 | 100 | ≤10 |

INDUSTRIAL APPLICABILITY

According to the invention there is provided a raw coke composition for a negative electrode material of a lithium ion secondary battery which is useful for achieving excellent high-speed charge-discharge characteristics for lithium ion secondary batteries, as well as a method for producing the same.

The invention claimed is:

1. A method for producing a carbon material for a negative electrode material of a lithium ion secondary battery, comprising the steps of:
    a first step of preparing a stock oil composition containing a first heavy oil obtained by hydrodesulfurization treatment and having a sulfur content of no greater than 0.6 wt %, a nitrogen content of no greater than 0.3 wt % and an aromatic index of 0.1 or greater, and a second heavy oil with an aromatic index of 0.3 or greater and an initial boiling point of 150° C. or higher, and
    a second step of coking treatment of the stock oil composition to obtain petroleum raw coke satisfying the following conditions (A):
    (A) the ratio of the crystallite size Lc(002) and lattice constant co(002) (Lc(002)/co(002)) on the 002 plane is no greater than 180, and the ratio of the crystallite size La(110) and the lattice constant ao(110) (La(110)/ao(110)) on the 110 plane is no greater than 1500, as determined by X-ray diffraction when the petroleum raw coke composition has been subjected to graphitizing in an inert gas atmosphere at a temperature of 2800° C.,
    a third step of calcining the petroleum raw coke at 1200 to 1500° C. under an inert gas atmosphere to obtain calcined carbon; and
    a fourth step of heat treatment of the calcined carbon at 2000 to 2400° C. under an inert gas atmosphere to obtain a carbon material for a negative electrode material of a lithium ion secondary battery.

2. The method according to claim 1, wherein the first heavy oil is obtained by hydrodesulfurization treatment of a heavy oil under conditions with a sulfur content of 1 wt % or greater and a hydrogen partial pressure of 5 MPa or greater.

3. The method according to claim 1, wherein the raw coke composition obtained in the second step has a sulfur content of no greater than 0.4 wt % and a nitrogen content of no greater than 0.3 wt %.

4. The method according to claim 1, wherein the first heavy oil content is 10-50 parts by weight and the second heavy oil content is 50-90 parts by weight, with respect to 100 parts by weight as the total weight of the stock oil composition.

* * * * *